United States Patent [19]
Russell et al.

[11] Patent Number: 6,080,458
[45] Date of Patent: *Jun. 27, 2000

[54] SELF-ADHERING WALKWAY PADS FOR ROOFING MEMBRANES AND METHOD FOR THE APPLICATION THEREOF TO ROOFS

[75] Inventors: Donald R. Russell, Carmel; Joseph J. Kalwara, Indianapolis, both of Ind.

[73] Assignee: Bridgestone/Firestone, Inc., Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/039,849

[22] Filed: Mar. 16, 1998

Related U.S. Application Data

[63] Continuation of application No. 08/606,119, Feb. 23, 1996, abandoned.

[51] Int. Cl.[7] ........................................................ C09J 7/02
[52] U.S. Cl. ........................ 428/41.7; 428/41.8; 428/42.2; 428/354
[58] Field of Search ..................... 428/343, 354, 428/41.7, 41.8, 42.2

[56] References Cited

U.S. PATENT DOCUMENTS

| | | | |
|---|---|---|---|
| 3,816,371 | 6/1974 | Baldwin et al. | 260/79.5 C |
| 4,379,114 | 4/1983 | Fujiki et al. | 264/248 |
| 4,404,056 | 9/1983 | Kakehi et al. | 156/244.11 |
| 4,581,092 | 4/1986 | Westley | 156/309.9 |
| 4,588,637 | 5/1986 | Chiu | 428/355 |
| 4,601,935 | 7/1986 | Metcalf et al. | 428/57 |
| 4,719,734 | 1/1988 | Fell et al. | 52/302 |
| 4,855,172 | 8/1989 | Chiu | 428/57 |
| 4,885,887 | 12/1989 | Simmons et al. | 52/410 |
| 5,095,068 | 3/1992 | Chiu | 524/525 |
| 5,204,148 | 4/1993 | Alexander | 428/40 |
| 5,242,727 | 9/1993 | Briddell et al. | 428/42 |
| 5,439,735 | 8/1995 | Jamison | 428/255 |
| 5,504,136 | 4/1996 | Davis | 524/490 |
| 5,563,217 | 10/1996 | Davis | 525/194 |
| 5,579,619 | 12/1996 | Godschalx | 52/409 |

*Primary Examiner*—Jenna Davis
*Attorney, Agent, or Firm*—David G. Burleson; Daniel N. Hall; Arthur M. Reginelli

[57] ABSTRACT

A self-adhering walkway pad (20) comprises an elastomeric pad having upper and lower surfaces (21, 22) and a 100 percent solids tape (25) pre-applied to the lower surface of the pad, prior to use in the field. A method for applying walkway pads to roofing membranes comprises affixing a 100 percent solids tape to one flat surface of a walkway pad, prior to use in the field, the opposite side of the tape carrying a protective layer of release paper; stripping the release paper from the tape immediately prior to use; subsequently placing the exposed surface of the tape directly onto the upper surface of the roofing membrane and, applying force directly to the walkway pad to enhance the bond between the pad and the membrane, created by the tape.

15 Claims, 2 Drawing Sheets

SELF-ADHERING WALKWAY PADS FOR ROOFING MEMBRANES AND METHOD FOR THE APPLICATION THEREOF TO ROOFS

This application is a continuation of U.S. Ser. No. 08/606,119 filed on Feb. 23, 1996, now abandoned.

TECHNICAL FIELD

The present invention relates generally to roofing membranes, such as are generally manufactured from reinforced or unreinforced rubber sheets comprising ethylene-propylene-diene (EPDM) terpolymers, ethylene-propylene copolymers, or other similar olefin-type polymers, and mixtures thereof, as well as sheeting manufactured from butyl, neoprene, or other polymers, including polyvinyl chloride (PVC), chlorinated polyethylene (CPE), chlorosulfonated polyethylene and the like. More particularly, the present invention is directed toward walkway pads which are placed over the roofing membrane in order to protect it from foot traffic, necessitated by excursions onto the covered roof to service, for instance, HVAC units, exhaust fans, smoke hatches, condenser units, window washing equipment, lightening protection units and the like. It is common to specify the use of walkway pads in areas where the frequency of traffic exceeds one excursion per month. The present invention also provides a method for the application of walkway pads to roofing membranes.

BACKGROUND OF THE INVENTION

Polymeric roof sheeting is used as single ply roofing membrane for covering industrial and commercial flat roofs. Such membranes are generally applied to the roof surface in vulcanized or cured state.

Because of outstanding weathering resistance and flexibility, cured EPDM based roof sheeting has rapidly gained acceptance. While this material is suitable for covering the roof and, it is capable of withstanding some traffic, it is customary to apply walkway pads, comprising rubber materials, directly onto the membrane defining a traffic pattern to areas of the roof to which travel is required. Walkway pads are known and accordingly, the present invention applies to all such pads.

Walkway pads are currently applied to roofing membranes and other forms of roof covering material with the use of liquid adhesives or tape adhesives which are applied to the walkway pad in the field, prior to installing the walkway pad on the roof surface. This method involves cleaning and/or priming the walkway pad just prior to field applying the liquid or adhesive tape to pad. The field applied adhesive keeps the walkway pad in place on the roof surface, and the walkway pad serves to protect the roof system/ membrane from foot traffic. Attendant this method is the emission of volatile organic compounds, or VOC's, released during cleaning and priming of the walkway pad. Moreover, there is a fair amount of labor necessitated with this method of application.

Tape compositions are known and are used not only to adhere walkway pads, but also for seaming roofing membranes together. As an example, uncured polymeric tapes containing no vulcanizing agents, i.e., non-curable tapes, have been developed.

Another type of adhesive composition often used for joining roofing sheet membranes together is that which is initially unvulcanized but which contains curatives so as to be vulcanizable. These adhesives, commonly referred to as rooftop curable adhesives, are typically used in the form of a preformed tape to bond sheet membranes and the like together.

In order to provide adhesion and a watertight seal between the tape and the rubber sheeting upon contact, these adhesive tapes typically include a tackifying additive compatible with the rubber employed such as polybutene. It has been found that polybutene, when used with a butyl rubber composition, provides an adhesive tape having sufficient surface tack and "quick-grab" as well as adequate green strength for use in adhering roofing sheet membranes together.

Accordingly, heretofore, most pressure sensitive adhesives used to join rubber roofing membranes together included a rubbery polymer composition based on butyl rubber or butyl rubber blended with various amounts of EPDM. The cured adhesive also included a cure package, typically based upon the use of a sulfur, peroxide or quinoid crosslinking system.

For example, Chiu U.S. Pat. Nos. 4,588,637, 4,855,172 and 5,095,068 disclose adhesive compositions, prepared in the form of a cured adhesive tape, which comprises butyl rubber-based compositions made by compounding a butyl rubber, a curing agent for the butyl rubber, carbon black, and a compatible tackifying additive.

Metcalf et al. U.S. Pat. No. 4,601,935 discloses a seaming tape comprising a carbon black-reinforced, compounded, lightly cured blend of a butyl rubber and a polyisobutylene. The seaming tape serves to adhere the primer-coated seam edges of EPDM membranes together.

Briddell et al. U.S. Pat. No. 5,242,727 discloses a cured adhesive tape composition which includes substantially equal amounts by weight of a rubbery polymer comprising a blend of EPDM, a halogenated butyl rubber or a halogenated isobutylene-based copolymer and polyisobutylene, a compatible tackifying additive and a compatible accelerator/ cure package for the rubbery polymer blend.

It is clear that all of the above adhesive tape compositions include butyl rubber (IIR). The term "butyl rubber" as used herein is intended to include copolymers of isobutylene and isoprene as well as other rubbery copolymers comprising at least 50 percent by weight of an isoolefin having 4 or more carbon atoms and 50 percent or less by weight of an open chain conjugated diolefin having from 4 to 8 carbon atoms. "Butyl rubber" is intended to also include halogenated butyl rubber, such as chlorobutyl or bromobutyl rubber, as well as those types of butyl rubber in which conjugated diene functionality has been added in the linear backbone at the diolefin units, such as more particularly described in U.S. Pat. No. 3,816,371.

Some patents have recognized the use of EPDM in tape compositions. For example, Fujuki et al. U.S. Pat. No. 4,379,114 discloses a curable tape which may include a vulcanizable, but unvulcanized EPDM rubber, butyl rubber, or a blend thereof. The curable tape may further include a vulcanizing agent and accelerator, a softening agent, and other ingredients such as fillers and the like.

Kakehi et al. U.S. Pat. No. 4,404,056 discloses a cold-vulcanizable adhesive tape having a Mooney viscosity of from about 5 to 25 and which includes a rubbery polymer comprising EPDM, butyl rubber or a blend thereof, as well as a vulcanizing agent, a vulcanization accelerator, an adhesive (tackifying) agent and a softening agent.

Westley U.S. Pat. No. 4,581,092 discloses a preformed adhesive tape composition comprising EPDM or halogenated butyl rubbers, at least one polyisocyanate, a low-temperature and a high-temperature tackifying additive, and at least one curing agent.

While the use of various adhesive tapes to adhere walkway pads to roofing membranes is known, the art has not heretofore recognized self-adhering walkway pads or a method for applying walkway pads to roofs involving the use of self-adhering walkway pads.

SUMMARY OF THE INVENTION

It is an object of the present invention to provide a self-adhering walkway pad for direct application to roofing membranes.

It is another object of the present invention to provide a method for the application of roof walkway pads to roofing membranes.

It is still another object of the present invention to provide a method for the application of roof walkway pads to roofing membranes which reduces the emission of volatile organic compounds.

Yet another object of the present invention is to provide walkway pads and a method for their application which allows a uniform, metered amount of properly placed adhesive to be applied to the walkway pad, under controlled conditions, prior to use in the field.

It is still another object of the present invention to provide walkway pads and a method for their application which reduces labor required to install the pads on the roof.

It is still another object of the present invention to provide walkway pads and a method for their application which allows enhanced adhesion of the tape adhesive to the walkway pad because the tape is applied in the factory under controlled conditions rather than in the field where contamination and variation in application techniques is considerably more of a problem.

In general the present invention relates to a self-adhering walkway pad comprising an elastomeric pad having upper and lower surfaces and a 100 percent solids tape pre-applied to the lower surface of the pad, prior to use in the field.

A method for applying walkway pads to roofing membranes comprises affixing a 100 percent solids tape to one flat surface of a walkway pad, prior to use in the field, the opposite side of the tape carrying a protective layer of release paper; stripping the release paper from the tape immediately prior to use; subsequently placing the exposed surface of the tape directly onto the upper surface of the roofing membrane and, applying force directly to the walkway pad to enhance the bond between the pad and the membrane, created by the tape.

At least one or more of the foregoing objects which shall become apparent to those skilled in the art are described in greater detail with reference to the specification which follows.

PREFERRED EMBODIMENT OF THE INVENTION

Figure 1:
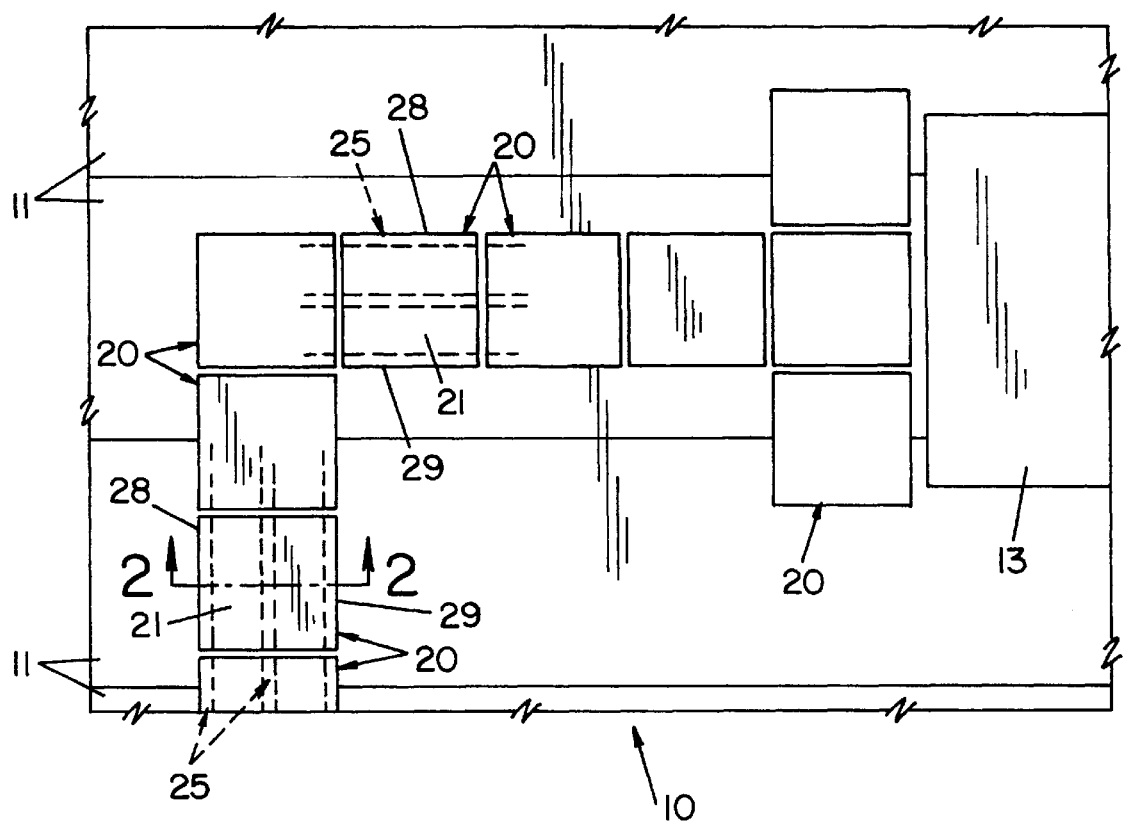
FIG. 1 is a top plan view of a portion of a roof covered with a roofing membrane and carrying a plurality of walkway pads.

With reference to the drawings, FIG. 1 depicts a portion of a flat roof 10, covered by a plurality of roof sheeting membranes 11. Upon the roof is a unit of roof-mounted equipment, such as an air conditioning apparatus 13. A plurality of walkway pads, generally 20, have been applied on the membranes 11 along a traffic path to the apparatus 13.

Figure 2:
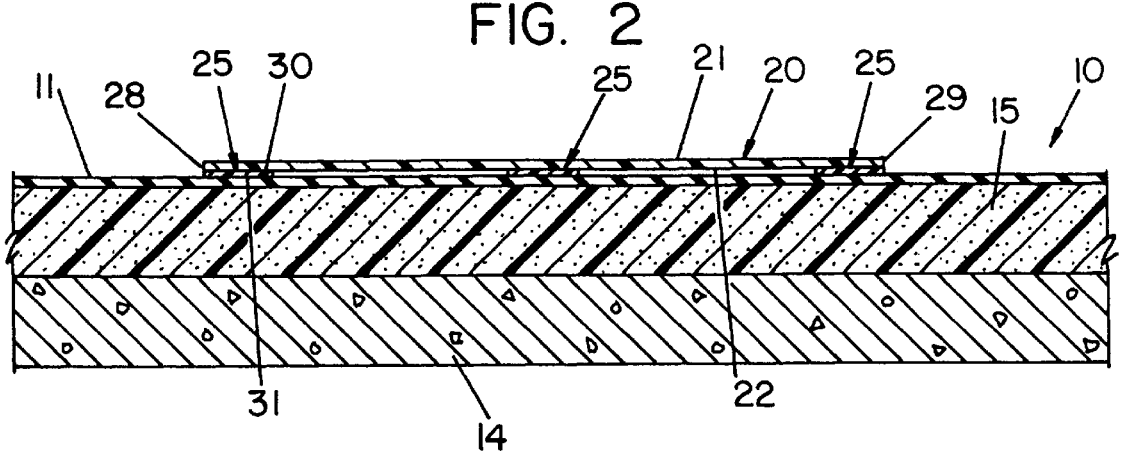
FIG. 2 is an enlarged side elevation, taken substantially along the lines 2—2 of FIG. 1, and depicting the roofing membrane and overlying walkway pad.

FIG. 2 depicts a section of the roof in cross-section, revealing the roof deck 14, which typically comprises metal, wood, concrete or the like, and a layer of insulation 15, placed thereover. The roof sheeting membranes 11 are placed down next, to which are applied the walkway pads 20, where desired. It is to be appreciated that the roof construction depicted is exemplary only and is not to be construed as constituting a limitation of the present invention. On the contrary, the self-adhering walkway pads of the present invention and the related method can be employed on virtually any membrane covered roof, irrespective of the construction or method of applying and finishing the roof. Thus, for example, where membrane roofs are ballasted, it is customary to move aside the ballast in order to maximize the bond between the membrane and walkway pad. Subsequent to application of the pads, the ballast can be redistributed over the membrane and around the pads.

Figure 3:
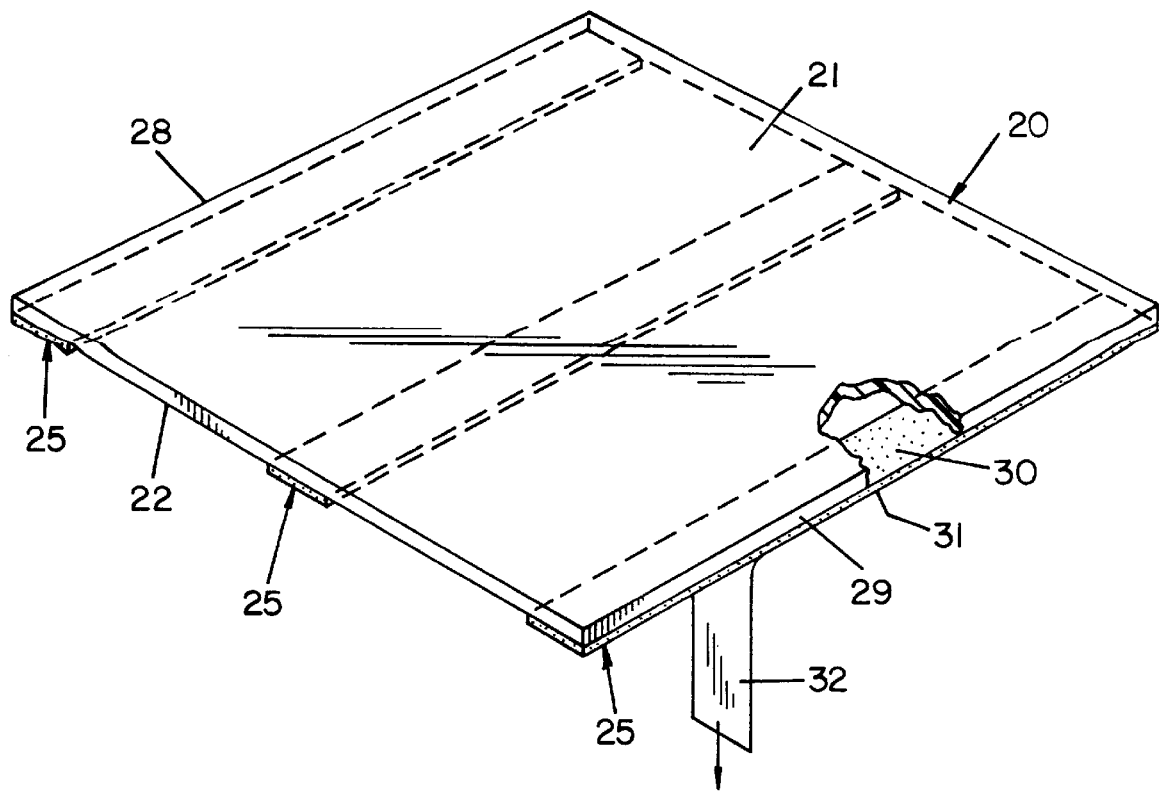
FIG. 3 is a perspective view of a self-adhering walkway pad, according to the present invention.

In FIG. 3, the walkway pad 20 is depicted. While a variety of pads are known, typically the pad is a rubber and its dimensions are about 30 inches square and 0.30 inches thick, although thicknesses generally range between about 0.25 and 0.5 inches. The pad provides upper and lower surfaces, 21 and 22 respectively. Typically, the lower surface is relatively smooth while the upper surface can be textured to improve traction. An adhesive tape 25 is preferably applied in a series of strips such as at two of the edges 28 and 29, and at the center of the pad 20, adhered directly to the lower surface 22. The adhesive tape 20, which will be described in greater detail hereinbelow, provides upper and lower surfaces, 30 and 31 respectively, the upper surface 30 being applied to the lower surface 22 of the pad.

As noted hereinabove, this application of the tape is made at the factory, as part of the manufacturing operation. At this stage, the pad is relatively clean, so that separate cleaning and/or priming operations are not required. Moreover, adhesion between the tape and pad is maximized due to the clean and controlled conditions for application as opposed to the field, i.e., upon a roof, where the pads may have become soiled or contaminated by the "blooming" of compounds such as zinc stearates when present, which will interfere with the adhesion of the tape to the pad. For example, it is often the practice with existing techniques for applying walkway pads, to convey a bundle of pads onto the roof and have service personnel apply them. If an entire bundle is not required, the remainder is saved, transported and stored for subsequent use. Eventually, the service personnel must clean and prime each pad, try to apply the adhesive strips evenly and correctly and then place the pads on the roof. Considering the many different steps involved and adding in the weather as an independent factor, the results are often inferior.

According to the present invention, once the pads have had the adhesive tapes 25 pre-applied, a release paper 32 is applied to the lower side 31 of the tape 25. The release paper 32 prevents exposure of the surface 31 to dust and the like prior to installation on the roof and prevents adjacent stacked walkway pads from adhering together. Then in the field, i.e., the rooftop, all that is required is for the service personnel to strip away the release paper, place the self-adhesive walkway pad onto the roof and then apply pressure which can be accomplished merely by walking over the pads or with the use of a roller, where such equipment is available and/or desirable.

The adhesive tape 25 should possess good storage stability, i.e., good shelf-life, and excellent "quick-grab" and have sufficient surface tack for rooftop installation. More particularly, the adhesive tape composition includes a polymer blend containing at least one EPDM rubber and an adhesive-enhancing polymer such as polyisoprene, polybutadiene, and ethylene-propylene copolymer and mixtures thereof to enhance adhesion as detailed hereinbelow. Butyl rubber-based adhesive compositions can also be employed as well as blends thereof with EPDM materials. Examples of butyl rubber include those disclosed hereinabove in the Background section. The adhesive tape formulations can comprise from 0 to 100 parts by weight of EPDM and from 0 to 100 parts by weight of butyl rubber in various combinations to total 100 parts by weight, where blends are employed.

Examples of suitable adhesive tape formulations are commercially available from Adco Products Inc., as their 510 or their 303 formulation. Another suitable adhesive tape formulation is commercially available from Ashland Chemical as their 408 formulation. These formulations are also described in U.S. Pat. Nos. 4,855,172, 5,242,727 and 5,234,987 the subject matter of which is incorporated herein by reference. Another EPDM tape composition is described in co-pending application U.S. Ser. No. 08/330,041, commonly owned by the Assignee of record, the subject matter of which is also incorporated herein by reference.

The adhesive composition can be formed into a tape using conventional mixing, extruder or other suitable extrusion equipment. The tape is generally in the form of a continuous strip having a preferred thickness of from 20 to 60 mils. The desired width of the tape can range from about one to three inches, however, tapes having a width of as wide as seven inches may have utility in this invention. For convenience, the tape is typically provided with a conventional release paper and wound into a roll for transportation and storage.

As noted hereinabove, the adhesive tape 25, of whatever composition, is pre-applied to the walkway pad 20 at the time of manufacture, so that the pad 20 is self-adhering upon removal of the release paper 32. The walkway pads can comprise a variety of materials including asphaltic materials, concrete and rubber-based materials, although the present invention is not necessarily limited to the selection of a particular walkway pad. Suitable rubber walkway pads are commercially available from Bridgestone/Firestone Inc., as their RubberGard Walkway Pads, which are formulated from reprocessed synthetic rubber, containing up to about 10 parts by weight of natural rubber. The rubber can contain fabric and non-metallic reinforcing cords.

Technical specifications of such walkway pads have been set forth in Table I, as follows:

TABLE I

TECHNICAL SPECIFICATIONS

| PROPERTY | TEST METHOD | MINIMUM PERFORMANCE |
| --- | --- | --- |
| Elongation, % min. Parallel to Grain Flow | ASTM D-412 (Die C) | 75 |
| Perpendicular to grain flow | | 75 |
| Brittleness Temp. | ASTM D-2137 | −40° F. |
| Hardness Shore A | ASTM D-2240 | 60 ± 5 |

After the pads are manufactured, the appropriate adhesive tape 25 is applied, as noted above, or in any other arrangement. Because the strips contain the release paper layer 32, they can be stacked and bundled for conventional handling. Moreover, they are protected from contaminants that would ultimately affect adhesion and, they will not prematurely adhere to unwanted substrates. For application to the rooftop, the tape 25, which is a 100 percent solids composition, has sufficient tack for most applications; however, a separate step of preparing the roof surface can be optionally employed. Preparing the surface can involve a pre-cleaning treatment of scrubbing and wiping utilizing soap and water or, the appropriate solvent to remove any grease, oil or other contaminants which could interfere with providing an adequate seal. Typical solvents used for cleaning the edges of the roofing membrane include hexane, heptane or toluene, however, solvent cleaning is generally not required. Priming may also be desired, to enhance bond formation although primer may not be necessary to use the self-adhering walkway pads of the present invention. Where a primer is used, one example suitable for use with this invention is Firestone's "QuickPrime®".

While there are currently no technical specifications set for minimum adhesion between a walkway pad and a roofing membrane, in order to evaluate the efficacy of the present invention, adhesion testing was initiated following the Rubber Manufacturer's Association (RMA) guidelines for field seams, set forth in Document RP10. Field seams are seams formed in the field i.e., on the rooftop, between mating and overlapping sheets of rubber sheeting membranes. Such seams are currently made using splice adhesives, which necessarily have high emissions of VOC's, and utilizing tape adhesives. In similar fashion, walkway pads can be adhered to roofing membranes with either splice adhesives or adhesive tapes.

Selecting rubber walkway pads as described hereinabove, evaluations were made by applying the adhesion tape in the factory, under controlled conditions, to some pads. Other pads were untreated and the tape was applied in the field just prior to application of the pad to the roofing membrane. Both pre-applied tape and field-applied tape pads were applied to roofing membranes under the same conditions, pursuant to RP10, and aged for 7 days at room temperature. Preliminary results have revealed that the pre-applied tape walkway pads provided adhesion as good as resulted from field application of the adhesive tape. RMA aging results also revealed peel adhesion values of at least 5 pounds per lineal inch (pli) for self-adhering walkway pads of the present invention (pre-applied tape) even though the values were slightly reduced as compared with the pads that received field-applied tape. Such results demonstrate that self-adhering walkway pads of the present invention and the method thereof provide overall excellent adhesion between the pads and the rooftop as well as a less labor intensive means of applying walkway pads to rooftops and, produce a considerable reduction in the emission of VOC's as compared to the existing state of the art.

Thus it should be evident that the self-adhering walkway pads and related method of the present invention are highly effective in placing and bonding the pads onto roof sheeting membranes. This invention is particularly suitable for use with rubber sheeting membranes for covering roofs, and with rubber walkway pads but is not necessarily limited thereto. For example, other tape compositions, walkway pad composition can be employed and other roof coverings can benefit from the use of the self-adhering walkway pads and method of the present invention.

Based upon the foregoing disclosure, it should now be apparent that the use of the self-adhering walkway pads described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A self-adhering walkway pad comprising:

a pad having upper and lower surfaces and opposed edges;

a 100 percent solids tape pre-applied to said pad lower surface proximal to said opposed edges, said tapes having a lower surface opposite said pad, wherein said edges are spaced apart so that said tapes are spaced apart; and a release paper applied to each said tape lower surface.

2. A self-adhering walkway pad, as set forth in claim 1, wherein said walkway pads comprise asphaltic materials, concrete and rubber-based materials.

3. A self-adhering walkway pad, as set forth in claim 1, wherein said adhesive tape comprises EPDM rubber, butyl rubber and blends thereof.

4. A self-adhering walkway pad, as set forth in claim 1, wherein said walkway pads comprise rubber-based materials and said adhesive tape comprises a blend of EPDM and butyl rubbers.

5. The pad according to claim 1, further comprising:

a 100 percent solids center tape pre-applied to said pad lower surface between said spaced apart edges and substantially parallel therewith, said center tape having a lower surface; and a center release paper applied to said center tape's lower surface.

6. In combination, a self-adhering walkway pad applied to a roofing membrane, the combination comprising:

a roofing membrane having a top surface;

a pad having upper and lower surfaces and opposed spaced apart edges, and said pad having a thickness in the range between about 0.25 and 0.5 inches;

a 100 percent solids tape pre-applied to only the lower surface of said pad on both said spaced apart edges, said tape having a lower surface opposite said pad; and a release paper applied to said lower surface of each said tape, wherein said release papers are removable from said tape lower surface which is then applied to said top surface of said roofing membrane.

7. The combination, as set forth in claim 6, wherein said walkway pad comprises asphaltic materials, concrete and rubber-based materials.

8. The combination, as set forth in claim 6, wherein said adhesive tape comprises EPDM rubber, butyl rubber and blends thereof.

9. The combination, as set forth in claim 6, wherein said walkway pads comprise rubber-based materials and said adhesive tape comprises a blend of EPDM and butyl rubbers.

10. The pad of claim 6, where the dimensions of said pad are about 30 inches square.

11. A self-adhering walkway pad comprising:

a pad having upper and lower surfaces and opposed spaced apart edges, and a thickness in the range between about 0.25 and 0.5 inches;

a separate 100 percent solids tape positioned below only said pad on each said opposed edge; and a release paper positioned below each said tape.

12. A self-adhering walkway pad, as set forth in claim 11, wherein said walkway pad comprises asphaltic materials, concrete and rubber-based materials.

13. A self-adhering walkway pad, as set forth in claim 11, wherein said tape comprises EPDM rubber, butyl rubber and blends thereof.

14. A self-adhering walkway pad, as set forth in claim 11, wherein said pad comprises rubber-based materials and said tape comprises a blend of EPDM and butyl rubbers.

15. The pad of claim 11, where the dimensions of said pad are about 30 inches square.

* * * * *